(12) United States Patent
Kim et al.

(10) Patent No.: US 9,332,517 B2
(45) Date of Patent: May 3, 2016

(54) METHOD AND DEVICE FOR TRANSMITTING A SYNCHRONIZATION SIGNAL IN A WIRELESS COMMUNICATION SYSTEM

(75) Inventors: Suhwook Kim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 14/113,551

(22) PCT Filed: Dec. 9, 2011

(86) PCT No.: PCT/KR2011/009500
§ 371 (c)(1),
(2), (4) Date: Oct. 23, 2013

(87) PCT Pub. No.: WO2012/150750
PCT Pub. Date: Nov. 8, 2012

(65) Prior Publication Data
US 2014/0044118 A1    Feb. 13, 2014

Related U.S. Application Data

(60) Provisional application No. 61/481,223, filed on May 1, 2011, provisional application No. 61/481,224, filed on May 1, 2011.

(51) Int. Cl.
*H04W 56/00* (2009.01)
*H04J 3/06* (2006.01)

(52) U.S. Cl.
CPC ............. *H04W 56/0075* (2013.01); *H04J 3/06* (2013.01); *H04W 56/0005* (2013.01); *H04W 56/001* (2013.01)

(58) Field of Classification Search
CPC ................... H04W 56/0005; H04W 56/0075; H04W 56/001; H04W 84/12; H04W 48/12; H04W 72/0406; Y02B 60/50
See application file for complete search history.

(56) References Cited

U.S. PATENT DOCUMENTS 6,968,194 B2 * 11/2005 Aljadeff et al. ............. 455/456.1
7,881,755 B1 * 2/2011 Mishra et al. ................. 455/574
(Continued)

FOREIGN PATENT DOCUMENTS

| KR | 10-2006-0102327 | 9/2006 |
| KR | 10-2008-0058275 | 6/2008 |
| KR | 10-2009-0123923 | 12/2009 |

OTHER PUBLICATIONS

Lai, et al., "Efficient and scalable IEEE 802.11 Ad-Hoc-Mode Timing Synchronization Function," 17th International Conference on Advanced Information Networking and Applications (AINA '03), IEEE, Mar. 2003, 6 pages.
(Continued)

*Primary Examiner* — Gary Mui
*Assistant Examiner* — Michael Phillips
(74) *Attorney, Agent, or Firm* — Lee Hong Degerman Kang & Waimey; Jonathan Kang; Jeffrey Lotspeich

(57) ABSTRACT

The present invention relates to a method and device for an access point to transmit a signal in a wireless communication system. A method for an access point to transmit a synchronization signal includes: generating a frame for synchronizing a timer of a station connected to an access point; and transmitting the frame for synchronization. The frame for synchronization may be transmitted before/after all Target Beacon Transmission Times.

12 Claims, 12 Drawing Sheets

(56) References Cited

U.S. PATENT DOCUMENTS

| | | | |
|---|---|---|---|
| 8,913,599 B2* | 12/2014 | Gonikberg et al. | 370/338 |
| 2003/0021254 A1* | 1/2003 | Fukuda | 370/338 |
| 2003/0137970 A1* | 7/2003 | Odman | 370/350 |
| 2005/0068928 A1* | 3/2005 | Smith et al. | 370/338 |
| 2005/0141565 A1* | 6/2005 | Forest et al. | 370/503 |
| 2008/0225768 A1* | 9/2008 | Wentink | 370/311 |
| 2009/0180425 A1* | 7/2009 | Watanabe | 370/328 |
| 2009/0248900 A1* | 10/2009 | Marucheck et al. | 709/248 |
| 2010/0035629 A1* | 2/2010 | Soliman | 455/455 |
| 2010/0284380 A1* | 11/2010 | Banerjee et al. | 370/338 |
| 2010/0315954 A1* | 12/2010 | Singh et al. | 370/241 |
| 2011/0176464 A1* | 7/2011 | Warner et al. | 370/311 |
| 2011/0299472 A1* | 12/2011 | Kumar | 370/328 |
| 2012/0092184 A1* | 4/2012 | Carr et al. | 340/870.14 |
| 2012/0163349 A1* | 6/2012 | Fontaine et al. | 370/336 |
| 2012/0182976 A1* | 7/2012 | Thoukydides et al. | 370/336 |

OTHER PUBLICATIONS

Pande, et al., "A New Clock Synchronization Algorithm for Multi-Hop Wireless Ad Hoc Networks," Wireless Communication and Sensor Networks (WCSN), 2010 Sixth International Conference, IEEE, Dec. 2010, 5 pages.

PCT International Application No. PCT/KR2011/009500, Written Opinion of the International Searching Authority dated Jul. 31, 2012, 16 pages.

* cited by examiner (a)

| Timestamp | TSF braodcast offset | TSF braodcast rate |
|---|---|---|

METHOD AND DEVICE FOR TRANSMITTING A SYNCHRONIZATION SIGNAL IN A WIRELESS COMMUNICATION SYSTEM

CROSS-REFERENCE TO RELATED APPLICATIONS

This application is the National Stage filing under 35 U.S.C. 371 of International Application No. PCT/KR2011/009500, filed on Dec. 9, 2011, which claims the benefit of U.S. Provisional Application Serial Nos. 61/481,223, filed on May 1, 2011, and 61/481,224, filed on May 1, 2011, the contents of which are all hereby incorporated by reference herein in their entirety.

TECHNICAL FIELD

The present invention relates to a wireless communication system, and more particularly, to a method of transmitting a signal for synchronization and apparatus therefor.

BACKGROUND ART

The wireless local area network (hereinafter abbreviated WLAN) technology standard was established by IEEE (institute of electrical and electronics engineers) 802.11 standardization. IEEE 802.11a/b in IEEE 802.11 standard uses a band on 2.4 GHz or 5 GHz and provides a data rate of 11 Mbps (IEEE 802.11b) or 54 Mbps (IEEE 802.11a). IEEE 802.11g applies OFDM (orthogonal frequency division multiplexing) to provide a data rate of 54 Mbps. IEEE 802.11n applies MIMO-OFDM scheme to provide a data rate of 300 Mbps. The IEEE 802.11n uses maximum 40 MHz channel bandwidth to provide a data rate of maximum 600 Mbps.

As the pool of WLAN expands and WLAN-adopted applications are diversified, the demand for a new WLAN system supportive of performance higher than that supported by 802.11n standard is increasingly rising. VHF (very high frequency) WLAN system is one of IEEE 802.11 WLAN systems recently proposed to support a data processing speed of 1 Gbps or higher. For the standardization of VHT WLAN system, many ongoing efforts are made to research and develop such a scheme as PLCP (physical layer convergence procedure) format and the like to efficiently support 8×8 MIMO, channel bandwidths of 80 MHz or higher and coexistence of stations (e.g., VHT-STA, HT-STA, Legacy-STA, etc.) by IEEE 802.11 ac Work Group.

Moreover, ongoing standardization of regulating WLAN on TV idle band (i.e., white space) is made into 802.11af. The TV idle band (white space) includes a channel assigned to a broadcast channel allowed to be used by a licensed wireless device and mainly means a band between 512~698 MHz.

DISCLOSURE OF THE INVENTION

Technical Tasks

One object of the present invention is to provide a method and apparatus for efficiently transmitting a synchronization signal in a wireless communication system mentioned in the foregoing description.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting a signal, which is transmitted by an access point in a wireless communication system, according to a $1^{st}$ embodiment of the present invention includes the steps of generating a frame for synchronizing a timer of a station associated with the access point and transmitting the frame for the synchronization, wherein the frame for the synchronization is transmitted before/after every target beacon transmission time.

Preferably, the frame for the synchronization may include a timestamp field indicating a value of a timer of the access point and an offset field indicating an offset amounting to a difference between the target beacon transmission time and a transmission time of the frame.

More preferably, the offset may be determined as a maximum clock error of the timer of the station, the maximum clock error may be calculated from a time information of a listen interval field transmitted when the station is associated with the access point, and the time information may include an interval for the station to awake to receive a beacon frame in power save mode.

Preferably, the frame for the synchronization may be transmitted to all stations associated with the access point.

More preferably, the method may further include the steps of receiving a request for the frame for the synchronization from the station and transmitting the frame for the synchronization in response to the request independently from the target beacon transmission time.

In this case, the method may further include the steps of comparing a maximum clock error, which is calculated from a time information included in the request, of the timer of the station to the offset and if the offset is smaller than the maximum clock error, resetting the offset to the maximum clock error, wherein the time information includes an interval for the station to awake to receive a beacon frame in power save mode.

Moreover, the frame for the synchronization in response to the request further may include a field indicating a transmission rate.

To further achieve these and other advantages and in accordance with the purpose of the present invention, an apparatus for transmitting a signal in a wireless communication system according to a $2^{nd}$ embodiment of the present invention includes an RF (radio frequency) unit and a processor generating a frame for synchronizing a timer of a station associated with the apparatus, the processor transmitting the frame for the synchronization, wherein the frame for the synchronization is transmitted before/after every target beacon transmission time.

To further achieve these and other advantages and in accordance with the purpose of the present invention, a method of receiving a signal, which is received by a station in a wireless communication system, according to a $3^{rd}$ embodiment of the present invention includes the step of receiving a frame for synchronizing a timer from an access point, wherein the frame for the synchronization is transmitted before/after every target beacon transmission time.

Preferably, the frame for the synchronization may include a timestamp field indicating a value of a timer of the access point and an offset field indicating an offset amounting to a difference between the target beacon transmission time and a transmission time of the frame.

More preferably, the offset may be determined as a maximum clock error of the timer of the station, the maximum clock error may be calculated from a time information of a listen interval field transmitted when the station is associated with the access point, and the time information may include an interval for the station to awake to receive a beacon frame in power save mode.

Preferably, the frame for the synchronization may be broadcasted to all stations associated with the access point.

More preferably, the method may further include the steps of transmitting a request for the frame for the synchronization to the access point and receiving the frame for the synchronization in response to the request independently from the target beacon transmission time.

In this case, a time information for the access point to calculate a maximum clock error of the timer of the station may be included in the request, wherein if the offset is smaller than the maximum clock error, the frame for the synchronization including the offset reset to the maximum clock error may be received, and the time information may include an interval for the station to awake to receive a beacon frame in power save mode.

Moreover, the frame for the synchronization in response to the request may further include a field indicating a transmission rate.

To further achieve these and other advantages and in accordance with the purpose of the present invention, an apparatus for receiving a signal in a wireless communication system according to a $4^{th}$ embodiment of the present invention includes an RF (radio frequency) unit and a processor synchronizing a timer by receiving a frame for synchronizing the timer of the apparatus, wherein the frame for the synchronization is transmitted before/after every target beacon transmission time.

Advantageous Effects

According to the present invention, even if a clock error is generated from a station, it is able to raise probability of receiving a beacon frame normally. Moreover, if a beacon frame is not received due to a clock error, the present invention can decrease a time taken to stay in awake state to receive the beacon frame, thereby considerably saving power consumption.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 9 is a diagram of a response frame in response to a synchronization request according to one embodiment of the present invention.

BEST MODE FOR INVENTION

Figure 1:
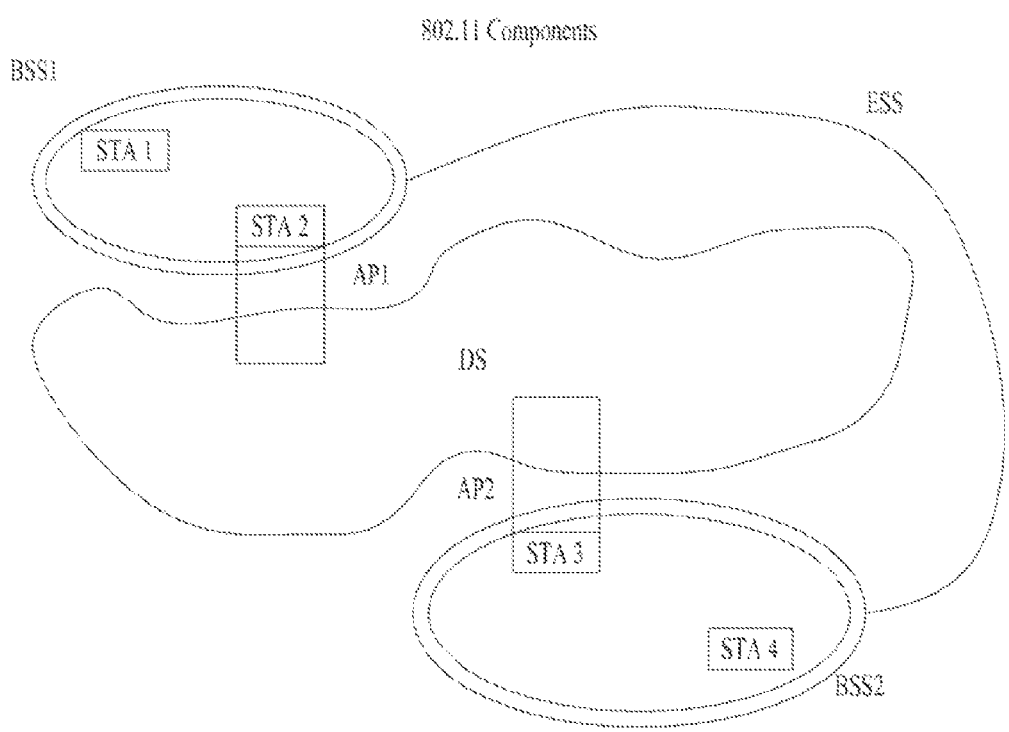
FIG. 1 is a diagram for a configuration of WLAN system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE/LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/

GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e specifications (e.g., WirelessMAN-OFDMA reference system) and advanced IEEE 802.16m specifications (e.g., WirelessMAN-OFDMA advanced system). For clarity, the following description mainly concerns IEEE 802.11 system, by which the technical idea of the present invention may be non-limited.

FIG. 1 is a diagram for a configuration of WLAN system.

Referring to FIG. 1, a WLAN system includes at least one basic service set (hereinafter abbreviated BSS). The BSS is a set of stations (hereinafter abbreviated STAs) capable of communicating with each other by successfully obtaining synchronization but does not indicate a specific area conceptionally.

A station (hereinafter abbreviated STA) is a random functional medium including a physical layer interface for medium access control (MAC) and a radio medium and includes both an access point (hereinafter abbreviated AP) and a non-AP STA in a broad sense. Among STAs, a mobile terminal manipulated by a user is a non-AP STA. If simply called an STA, it may indicate a non-AP STA. The non-AP STA can be called such a name as a terminal, a wireless transmit/receive unit (WTRU), a user equipment (UE), a mobile station (MS), a mobile terminal, a mobile subscriber unit and the like. Stations may be sorted into VHT-STA, HT-STA and Legacy-STA. The HT-STA supports IEEE 802.11n, the Legacy-STA supports IEEE 802.11a/b/g corresponding to a previous version of IEEE 802.11n, and the VHT-STA supports 802.11af standard.

The AP is a functional medium that provides an STA associated with the corresponding AP with an access to a distribution system (DS) via a radio medium. The AP may be called such a name as a centralized controller, a base station (BS), a node-B, a base transceiver system (BTS) and a site controller and the like as well as an access point.

The DS (distribution system) is a mechanism for one AP to communicate with another AP. The AP can transmit a frame via DS for STAs combined with a BSS managed by the AP. And, the AP is able to deliver a frame via DS if a prescribed STA moves away into another BSS. Moreover, the AP can deliver a frame via DS to such an external network as a wired network and the like. It is not necessary for the DS to be a network. No limitation is put on a configuration of the DS if the DS can provide a prescribed distribution service stipulated in IEEE 802.11. For instance, the DS may include such a wireless network as a mesh network or may include a physical structure capable of connecting APs with each other.

The BSS may be classified into an infrastructure BSS and an independent BSS (IBSS).

The infrastructure BSS may include at least one non-AP STA, an AP capable of providing a DS, and a DS capable of connecting a multitude of APs. In the infrastructure BSS, an AP manages non-AP STAs of the BSS. In the infrastructure BSS, a communication between the non-AP STAs is basically performed via the AP. Yet, if a direct link is established, a direct communication can be performed between the non-AP STAs.

On the other hand, the independent BSS (IBSS) is a BSS operating in Ad-Hoc mode. Since the IBSS does not include an AP, there is no centralized management entity that performs a management function at a center. In particular, in the IBSS, non-AP STAs are managed in a distributed manner. In the IBSS, all STAs can be configured with mobile STAs and an access to a DS is not allowed. Hence, a self-contained network is formed.

A plurality of infrastructure BSSs can be mutually connected via DS. A plurality of BSSs connected together via the DS are called an extended service set (hereinafter abbreviated ESS). STAs included in the ESS can communicate with each other. In the same ESS, a non-AP STA can move away from one BSS into another BSS while performing a seamless communication.

In the following description, embodiments of the present invention are explained mainly concerning an operation in the infrastructure BSS shown in FIG. 1, by which the present invention may be non-limited.

In the wireless communication system shown in FIG. 1, in order to reduce power consumption of a station, a power management mode is provided. In the power management mode, an STA may operate in active mode corresponding to an awake state or sleep mode corresponding to a doze state. In the active mode, the STA can perform a normal operation such as a frame transmission/reception, a channel scanning and the like. On the contrary, in the sleep mode, the STA is unable to perform transmission/reception and consumes a considerably small power.

As an STA operates longer in sleep mode, a power consumption gets smaller. Hence, a durability or life of the STA increases. Yet, since frame transmission/reception is impossible in the sleep mode, the STA is unable to keep operating in the sleep mode. Hence, in order to find out that there is a frame supposed to be received by the STA, the STA periodically enters an active mode from the sleep mode and then receives a beacon frame from an AP.

The beacon frame is transmitted by the AP in a beacon interval corresponding to predetermined periodicity. In order to receive the beacon frame, the STA enters the active mode from the sleep mode by at least one beacon interval periodicity. The AP transmits the beacon frame based on an internal timer and the STA operates in the active mode to receive the beacon frame based on its internal timer. Hence, only if the timers of the AP and the STA are synchronized with each other, the STA enters the active mode and is then able to normally receive the beacon frame.

IEEE 802.11 standard provides a time synchronization function (hereinafter abbreviated TSF) to synchronize clocks of timers of STAs of one BSS. The TSF is performed in a manner that an AP informs the STAs of a value of its timer (hereinafter named a TSF timer) through a timestamp field. Having received the value, the STA is synchronized with the AP in a manner of recalibrating its timestamp with reference to the timestamp of the AP. In this case, the timestamp has 8-octet length and is incremented by 1 on every lapse of 1 μsec.

Figure 2:
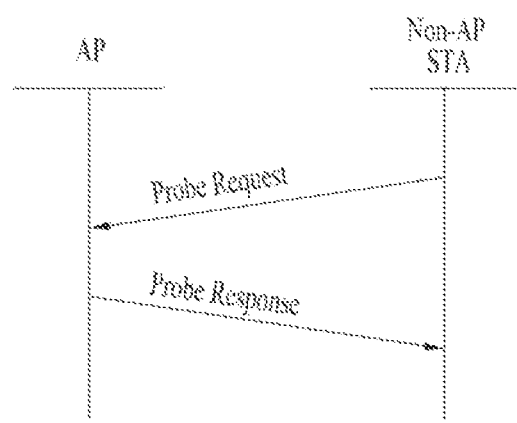
FIG. 2 is a diagram to describe a method for an access point to transmit a timestamp.
Figure 2:
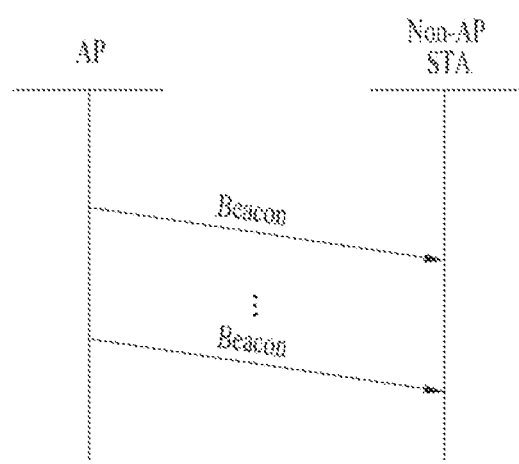

A method for an AP to transmit its timer, as shown in FIG. 2, can be categorized into two kinds of methods.

According to a $1^{st}$ method, a probe response frame is used. Referring to FIG. 2 (a), an STA performs an active scanning to find an accessible BSS. In doing so, the active scanning is performed in a manner of transmitting a probe request frame. Having received the probe request frame, an AP puts its BSS information in a probe response frame and then sends the probe response frame. In doing so, a timestamp is included therein.

According to a 2$^{nd}$ method, a beacon frame is used. Referring to FIG. 2 (b), an AP transmits a beacon frame for network management and operation periodically. In doing so, a timestamp is included in the beacon frame.

Meanwhile, since the above-configured wireless communication system mainly considers a burst traffic, it is unnecessary to set a long sleep mode. Hence, although a small error exists between AP and STA TSF timers, it is not a problem because the STA can synchronize the TSF timer after receiving a beacon frame.

Yet, the types of traffics tend to be diversified. Particularly, in case of M2M (machine-to-machine) and ubiquitous sensor network (USN), a traffic is transmitted once in several hours. So, each STA using such traffic has a sleep mode set long to considerably reduce power consumption.

If an operation is performed for a long time in sleep mode, a TSF timer of an STA may have a big difference from that of an AP due to a clock error caused by clock drift. In particular, a clock error is currently determined as 0.01% or less in IEEE 802.11 standard. Assuming that an STA awakes once in an hour to receive a beacon frame, the clock error may amount to maximum 360 msec.

If the STA enters an active mode from a sleep mode after a target beacon transmission time (hereinafter abbreviated TBTT) scheduled to transmit a beacon frame, it may miss the beacon frame because of the above-mentioned clock error. On the contrary, if the STA operates in active mode before TBTT, it wastes a power unnecessarily while waiting for a beacon frame reception. This is described in detail with reference to FIG. 3 as follows.

Figure 3:
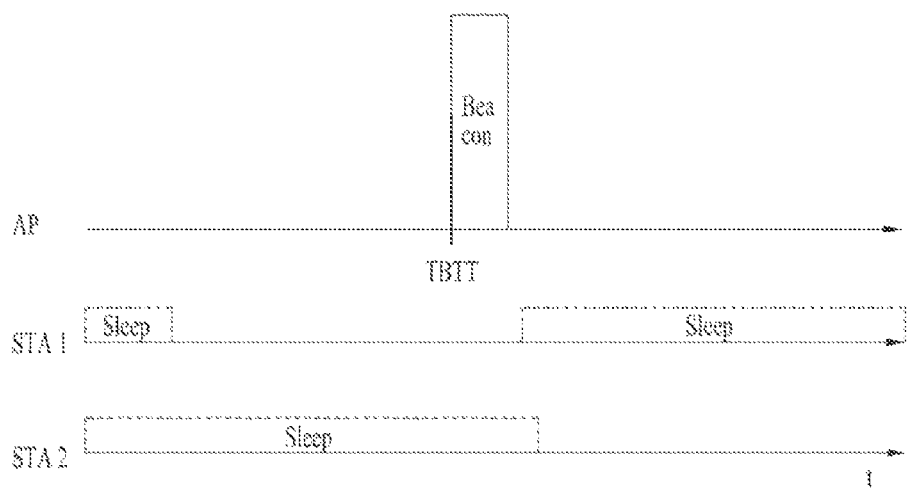
FIG. 3 is a diagram to describe a situation in switching a mode of a station to an active mode from a sleep mode before or after a target beacon transmitted time due to a clock error.

FIG. 3 is a diagram to describe a situation in switching a mode of a station to an active mode from a sleep mode before or after a target beacon transmitted time due to a clock error.

Referring to FIG. 3 (a), STA 1 enters an active mode before TBTT, maintains the active mode until the TBTT, and then receives a beacon frame. Hence, a power consumption is inevitable until TBTT from a timing point of entering the active mode.

FIG. 3 (b) shows a case that SAT 2 enters an active mode after TBTT and then fails in receiving a beacon frame. Hence, the SAT 2 keeps operating in the active mode until a next TBTT. Moreover, since the SAT 2 fails in receiving the beacon frame (i.e., the SAT 2 fails in obtaining a timestamp value), it is unable to perform synchronization of TSF timer. Therefore, it is highly probable that the SAT 2 may not receive the beacon frame in the next TBTT and subsequent TBTTs. If so, the SAT 2 may use a probe request/response frame to synchronize a TSF timer with an AP. Yet, since the probe request/response frame contains all information on a network, if an active scanning is performed through the probe request/response frame simply for the synchronization, a power consumption of the STA is considerably increased and a radio resource is inefficiently used due to a large overhead.

In particular, it is difficult to efficiently synchronize a TSF timer of an STA having a long sleep mode and a TSF timer of an AP with each other using a current TSF (time synchronization function). Therefore, the demand for a method of efficiently synchronizing clock of TSF timer between AP and STAs instead of an existing TSF is rising.

<1$^{st}$ Embodiment>

Figure 4:
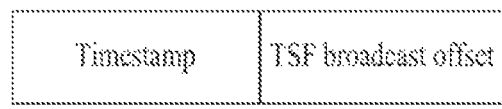
FIG. 4 is a diagram of a frame format for synchronization according to one embodiment of the present invention.

FIG. 4 is a diagram of a frame format for synchronization according to a 1$^{st}$ embodiment of the present invention. In the following description of the 1$^{st}$ embodiment of the present invention, a frame for synchronization is assumed as transmitted from an AP by broadcasting.

Referring to FIG. 4, a frame for synchronization (hereinafter named a TSF broadcast frame) includes a timestamp field and a TSF broadcast offset field. The timestamp field indicates a value of a TSF timer of an AP like being included in a beacon frame or a probe response frame. Having received the TSF broadcast frame, an STA can synchronize a clock with the AP using a value of the timestamp field.

In particular, the TSF broadcast frame indicates that it is transmitted at a prescribed time before/after TBTT.

The TSF broadcast offset field indicates a relationship between the TSF broadcast frame transmitted time and the TBTT. In particular, the TSF broadcast offset field includes an offset that is a difference between the TBTT and the TSF broadcast frame transmitted time. The STA uses the TSF broadcast offset to check how far the TBTT is temporally spaced apart from a currently received TSF broadcast frame.

In this case, the offset may be determined in consideration of a maximum error the TSF timer can have for a sleep mode time of the STA. In particular, as mentioned in the foregoing description, since a clock error of a TSF timer is maximum 0.01% in IEEE 802.11, if periodicity for the STA to enter an active mode from a sleep mode is obtained, it is able to determine a maximum error and an offset. In doing so, the periodicity for the STA to enter an active mode from a sleep mode can be obtained from a listen interval field transmitted when the STA is connected to the AP.

Figure 5:
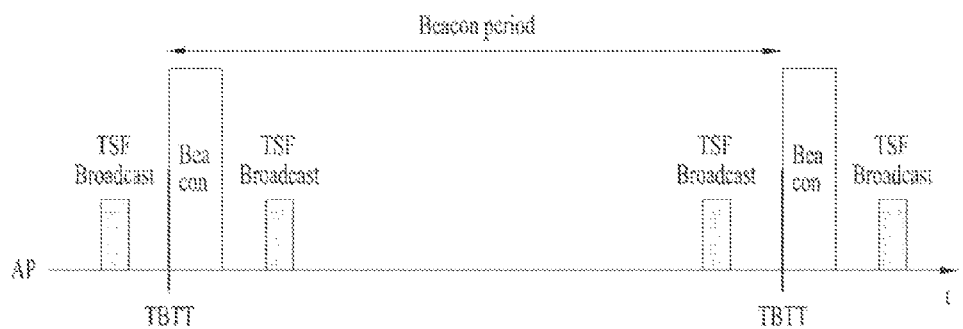
FIG. 5 and FIG. 6 are diagrams to describe a transmission of a frame for synchronization according to one embodiment of the present invention.
Figure 6:
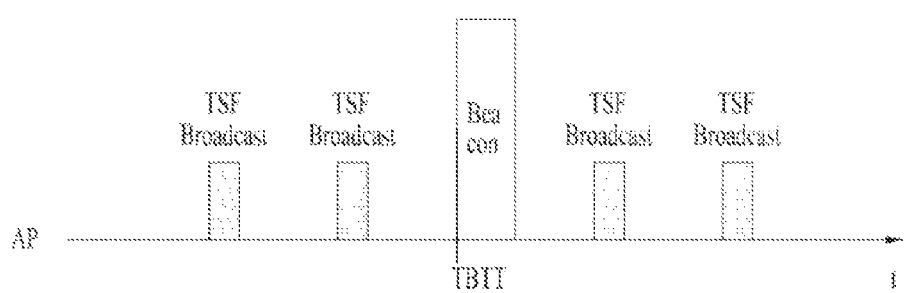

FIG. 5 and FIG. 6 are diagrams to describe a transmission of a frame for synchronization according to a 1$^{st}$ embodiment of the present invention.

Referring to FIG. 5, a TSF broadcast frame can be transmitted before/after a TBTT. In particular, the TSF broadcast frame can be transmitted at a time ahead of or behind the offset of the TSF broadcast offset field mentioned in FIG. 4 with reference to a TBTT.

Referring to FIG. 6, it can be observed that the TSF broadcast frame is transmitted twice ahead of the TBTT and is also transmitted twice behind the TBTT. In this case, even if an active mode is entered with an error greater than a maximum error of a TSF timer of STA, possibility of synchronization can be further raised. And, all terminals differing from each other in clock performance can be supported.

Figure 7:
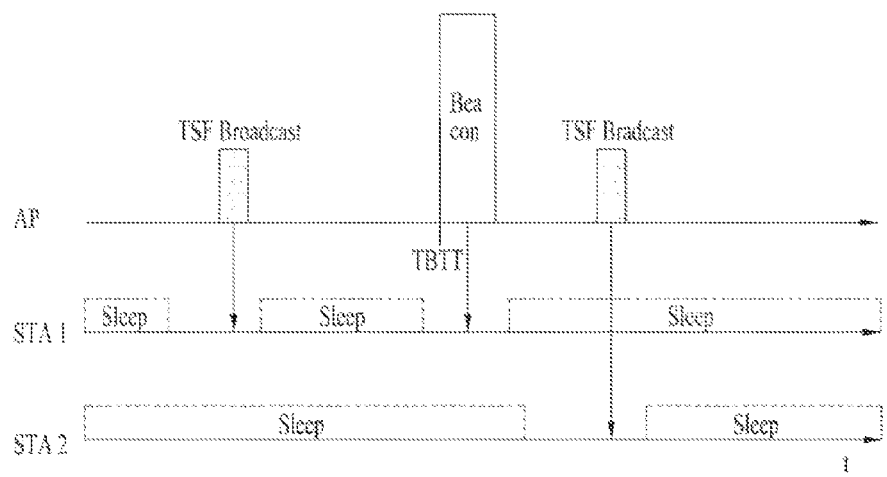
FIG. 7 is a diagram to describe an operation of a system to which one embodiment of the present invention is applied.

FIG. 7 is a diagram to describe an operation of a system to which one embodiment of the present invention is applied.

Referring to FIG. 7, STA 1 enters an active mode from a sleep mode before TBTT by a considerable time and should stand by to receive a beacon frame by wasting a power unnecessarily. Yet, the STA 1 receives a TSF broadcast frame transmitted before the TBTT and is then able to synchronize a TSF timer through a value of a timestamp field. Since the TSF timer is synchronized, the STA 1 returns to the sleep mode and then enters the active mode again to receive a beacon frame efficiently.

STA 2 enters an active mode after the TBTT and then fails in receiving a beacon frame. Yet, the SAT 2 can synchronize a TSF timer through a TSF broadcast frame transmitted after the TBTT. The STA 2 recognizes that it has entered the active mode after the TBTT through a TSF broadcast offset of the TSF broadcast frame, operates in sleep mode, and then awakes on a next TBTT.

Thus, even if STA fails in receiving a beacon frame due to an error of a TSF timer, it is able to synchronize a TSF timer with a TSF timer of AP through a TSF broadcast frame. Hence, since the STA can operate in sleep mode instead of staying in active mode due to the failure in receiving the beacon frame, it is able to reduce power consumption. Moreover, since the TSF broadcast frame has a frame size smaller than that of the beacon frame and can be transmitted at a rage higher than that of the beacon frame, its network overhead is not large considerably.

Figure 8:
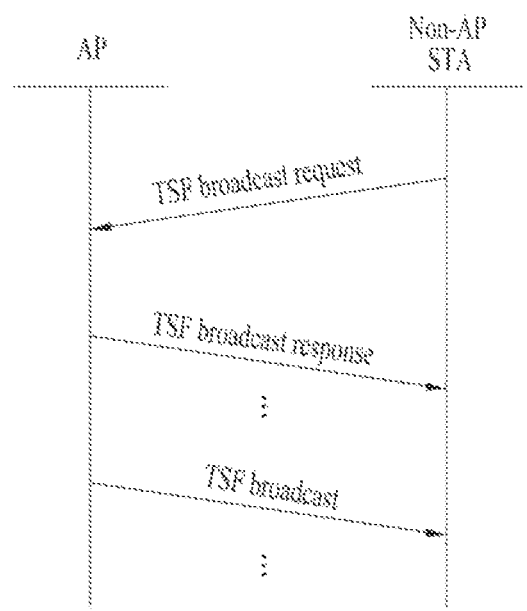
FIG. 8 is a diagram of a process for a station to request a frame for synchronization according to one embodiment of the present invention.

A frame for synchronization may be transmitted in response to a request made by an STA. FIG. 8 shows a process for an STA to make a request for a TSF broadcast to an AP. If the STA transmits a TSF broadcast request frame to the AP, the AP creates a new TSF broadcast frame or transmits a TSF broadcast response frame, in which one of informations on an existing TSF broadcast frame is contained, to the STA.

The TSF broadcast request frame includes a sleep interval field of the STA. In this case, the sleep interval field indicates that the STA receives a beacon frame by awaking in prescribed periodicity. And, a unit of the sleep interval field is a beacon period. Through this information, the AP can calculate a maximum clock error that can be retained by the STA. Considering this value, the STA determines how much offset will be set for the TSF broadcast frame with reference to the beacon frame.

For instance, if a value of a sleep interval field of the STA is 10 minutes currently, a maximum clock error is 60 msec in consideration of an error provided by IEEE 802.11 standard. The AP checks an offset of a currently used TSF broadcast frame. If the offset is smaller than 60 msec, the AP newly creates a TSF broadcast frame having an offset of 60 msec. If a TSF broadcast frame having an offset greater than 60 msec exists already, the AP can use the offset included in the corresponding TSF broadcast frame as it is.

A TSF broadcast response frame can be configured as shown in FIG. 9. A timestamp field indicates a value of a TSF timer of an AP like the former timestamp field included in a beacon frame or a probe response frame. Using this value, an STA can synchronize its TSF timer with a TSF timer of the AP. A TSF offset field indicates that a TSF broadcast frame is transmitted at a specific time ahead of or behind TBTT by a prescribed time. If the prescribed time is a negative value, the TSF broadcast offset field uses a signed integer to indicate that the TSF broadcast frame is transmitted before the TBTT. If the prescribed time is a positive value, the TSF broadcast offset field uses a signed integer to indicate that the TSF broadcast frame is transmitted after the TBTT. And, a TSF broadcast rate field indicates a transmission rate of the TSF broadcast frame.

The above-mentioned TSF broadcast frame can be transmitted before or after each TBTT. If an STA is aware of the information included in each TSF broadcast frame, the STA can adjust a sleep interval by itself. If the STA intends to increase a sleep interval due to shortage of its battery power, the STA checks informations of a currently transmitted TSF broadcast frame and is then able to adjust the sleep interval into a sleep interval value in consideration of an error of its own.

<2$^{nd}$ Embodiment>

Although the broadcast manner is used in the case of the 1$^{st}$ embodiment, synchronization may be used in a unicast manner, which is explained in the following description of a 2$^{nd}$ embodiment.

Figure 10:
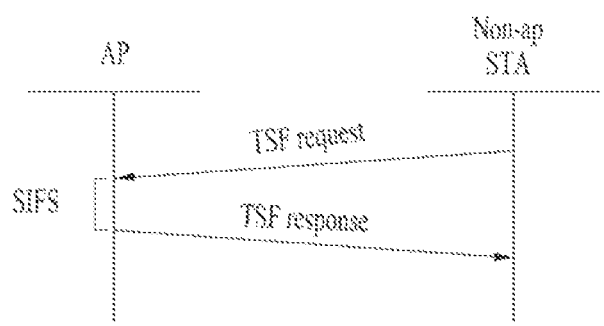
FIG. 10 is a diagram of a method for synchronization according to another embodiment of the present invention.

FIG. 10 is a diagram of a method for synchronization according to another embodiment of the present invention.

Referring to FIG. 10, an STA can make a request for a timestamp to an AP by transmitting a TSF request frame. Having received the TSF request frame, the AP transmits a TSF response frame containing the timestamp of the AP after SIFS (short inter frame space). In this case, the SIFS means a time, which has the shortest delay, defined in IEEE 802.11 for an acknowledgement of data packet and the like.

Table 1 shows a TSF request frame format. Since the TSF request frame format simply requests a timestamp, a special element is unnecessary. In brief, regarding Category field and Dialog Token field, as defined in IEEE 802.11 standard, the Category field indicates a category of a current action field. The Dialog Token field is the field used to match a response to a specific request. In particular, a request frame uses a random value and a response frame in response to this request frame uses the same value used by the request frame. If TSF Action field is set to 0, it can be refined as a TSF request. If TSF Action field is set to 1, it can be refined as a TSF response.

TABLE 1

| order | information |
|---|---|
| 1 | category |
| 2 | TSF Action |
| 3 | Dialog Token |

Table 2 shows a TSF response frame format. A timestamp is delivered to an STA by being contained in the TSF response frame. Details of the respective fields of this format can refer to the former description of the 1$^{st}$ embodiment.

TABLE 2

| order | information |
|---|---|
| 1 | category |
| 2 | TSF Action |
| 3 | Dialog Token |
| 4 | Timestamp |

Figure 11:
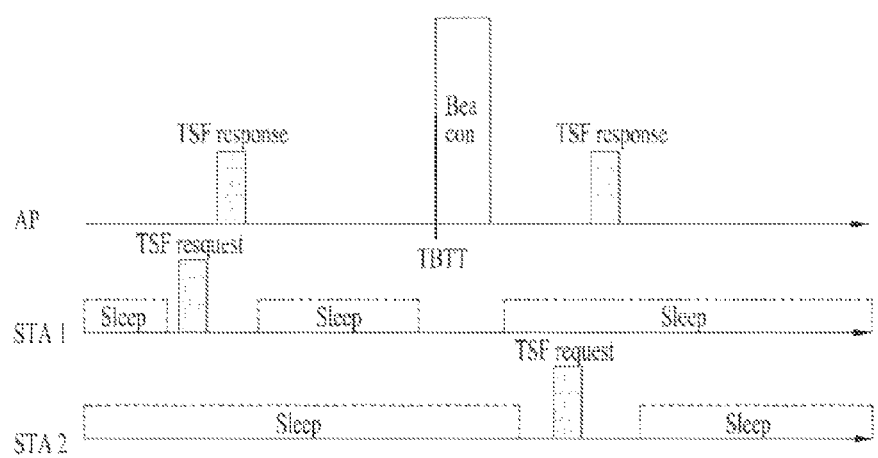
FIG. 11 is a diagram to describe an operation of a system to which another embodiment of the present invention is applied.

FIG. 11 is a diagram to describe an operation of a system to which another embodiment of the present invention is applied.

Referring to FIG. 11, STA 1 enters an active mode before TBTT due to a clock error and then waits for a beacon frame. Yet, since the beacon frame is not transmitted in this waiting time, the STA 1 recognizes that a TSF timer of the STA 1 has an error with an AP. In this case, the STA 1 can make a request for a timestamp to the AP using a TSF request frame. Subsequently, the STA 1 receives a TSF response frame from the AP in response to the request and is then able to synchronize the TSF timer using the timestamp contained in the received TSF response frame. Thereafter, the STA 1 reenters a sleep mode and then normally enters the active mode on TBTT to receive a beacon frame.

Meanwhile, STA 2 enters an active mode after the TBTT. Like the case of the STA 1, since a beacon frame is not transmitted on an expected time, the STA 2 recognizes that a TSF timer of the STA 2 has an error with the AP. Hence, the STA 2 makes a request for a TSF request frame to the AP, receives a TSF response frame, and is then able to synchronize the TSF timer with that of the AP.

Although the case of the above-mentioned 2$^{nd}$ embodiment may look similar to the probe request and response frames defined in IEEE 802.11 standard, there are differences inbetween as follows.

First of all, overhead is smaller than that of the probe request and response frames. Since the object of the probe request and response frames is scanning, information of a requesting STA and information on a BSS are contained. Yet, theses informations are unnecessary for an STA associated after performing the scanning. On the contrary, since time stamp information is only contained in TSF request/response frame, it is more efficient.

Secondly, the probe request/response frame always has a lowest transmission rate. Yet, since a TSF request/response can use a transmission rate higher than the lowest transmission rate, a time necessary for a transmission is small. This can reduce power consumption.

Thirdly, since a probe request frame is basically transmitted through contention (or contending) after a random time, it costs a long delay time. On the contrary, since a TSF response frame is transmitted right after SIFS, an STA can synchronize a TSF timer in quick time and then operates in sleep mode, thereby reducing power consumption.

Figure 12:
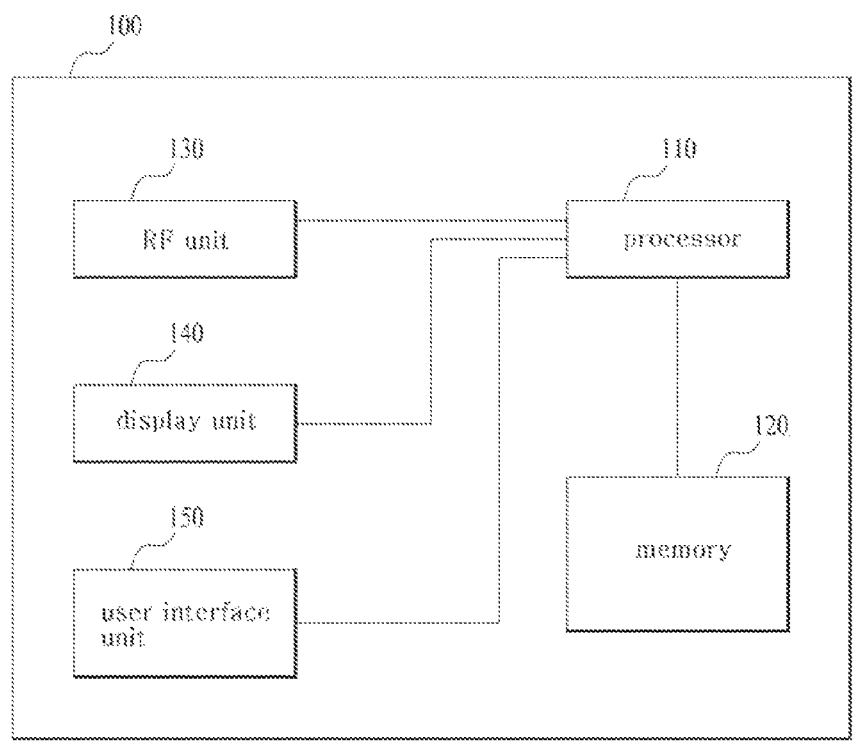
FIG. 12 is a block diagram for a configuration of a device to which embodiments of the present invention are applicable.

FIG. 12 is a block diagram for a configuration of a device to which embodiments of the present invention are applicable. Referring to FIG. 12, a device 100 includes a processor 110, a memory 120, an RF (radio frequency) unit 130, a display unit 140 and a user interface unit 150.

A layer of a physical interface protocol is performed by the processor 110. The processor 110 provides a control plane and a user plane. A function of each layer can be performed by the processor 110.

The memory 120 is electrically connected to the processor 110. And, operating systems, applications and general files can be stored in the memory 120.

If the device 100 is a user equipment, the display unit 140 can display various kinds of informations. And, the display unit 140 can be implemented using a well-known LCD (liquid crystal display), an OLED (organic light emitting diode) display and the like. The user interface unit 150 can be configured by being combined with such a well-known user interface as a keypad, a touchscreen and the like.

The RF unit 130 is electrically connected to the processor 110. The RF unit 130 transmits or receives a radio signal. The RF unit 130 may include a transmitting module and a receiving module. The transmitting module performs prescribed coding and modulation on a signal and/or data, which is to be externally transmitted by being scheduled by the processor 110, and is then able to deliver it to an antenna.

The receiving module reconstructs a radio signal externally received via an antenna into original data by performing decoding and demodulation on the radio signal and then delivers it to the processor 110.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, those skilled in the art can combine and use the configurations disclosed in the embodiments mentioned in the foregoing description. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention relates to a wireless communication system and is applicable to synchronization of a station in particular.

What is claimed is:

1. A method of transmitting a signal, which is transmitted by an access point in a wireless communication system, comprising:
generating a frame for synchronization of a timer of a station associated with the access point; and
transmitting the frame for the synchronization,
wherein the frame for the synchronization is transmitted before or after every target beacon transmission time,
wherein the frame for the synchronization comprises a timestamp field indicating a value of a timer of the access point and an offset field indicating an offset amounting to a difference between the target beacon transmission time and a transmission time of the frame for the synchronization, wherein the offset is determined as a maximum clock error of the timer of the station, wherein the maximum clock error is calculated from a time information of a listen interval field transmitted when the station is associated with the access point, and wherein the time information comprises an interval for the station to awake to receive a beacon frame in power save mode.

2. The method of claim 1, wherein the frame for the synchronization is transmitted to all stations associated with the access point.

3. The method of claim 1, further comprising:
receiving a request for the frame for the synchronization from the station; and
transmitting the frame for the synchronization in response to the request independently from the target beacon transmission time.

4. The method of claim 3, further comprising:
comparing the maximum clock error, which is calculated from the time information included in the request, of the timer of the station to the offset; and
if the offset is smaller than the maximum clock error, resetting the offset to the maximum clock error.

5. The method of claim 4, wherein the frame for the synchronization in response to the request further comprises a field indicating a transmission rate.

6. An apparatus for transmitting a signal in a wireless communication system, comprising:
an RF (radio frequency) unit; and
a processor generating a frame for synchronization of a timer of a station associated with the apparatus, the processor transmitting the frame for the synchronization,
wherein the frame for the synchronization is transmitted before or after every target beacon transmission time,
wherein the frame for the synchronization comprises a timestamp field indicating a value of a timer of the apparatus and an offset field indicating an offset amounting to a difference between the target beacon transmission time and a transmission time of the frame for the synchronization, wherein the offset is determined as a maximum clock error of the timer of the station, wherein the maximum clock error is calculated from a time information of a listen interval field transmitted when the station is associated with the apparatus, and wherein the time information comprises an interval for the station to awake to receive a beacon frame in power save mode.

7. A method of receiving a signal, which is received by a station in a wireless communication system, comprising receiving a frame for synchronization of a timer from an access point,
wherein the frame for the synchronization is transmitted before or after every target beacon transmission time,
wherein the frame for the synchronization comprises a timestamp field indicating a value of a timer of the access point and an offset field indicating an offset amounting to a difference between the target beacon transmission time and a transmission time of the frame for the synchronization, wherein the offset is determined as a maximum clock error of the timer of the station, wherein the maximum clock error is calculated from a time information of a listen interval field transmitted when the station is associated with the access point, and wherein the time information comprises an interval for the station to awake to receive a beacon frame in power save mode.

8. The method of claim 7, wherein the frame for the synchronization is broadcasted to all stations associated with the access point.

9. The method of claim 7, further comprising:
transmitting a request for the frame for the synchronization to the access point; and
receiving the frame for the synchronization in response to the request independently from the target beacon transmission time.

10. The method of claim 9, wherein the time information to calculate the maximum clock error of the timer of the station is included in the request, wherein if the offset is smaller than the maximum clock error, the frame for the synchronization including the offset reset to the maximum clock error is received.

11. The method of claim 9, wherein the frame for the synchronization in response to the request further comprises a field indicating a transmission rate.

12. An apparatus for receiving a signal in a wireless communication system, comprising:
an RF (radio frequency) unit; and
a processor synchronizing a timer by receiving a frame for synchronization of the timer of the apparatus,
wherein the frame for the synchronization is transmitted before or after every target beacon transmission time,
wherein the frame for the synchronization comprises a timestamp field indicating a value of a timer of the apparatus and an offset field indicating an offset amounting to a difference between the target beacon transmission time and a transmission time of the frame for the synchronization, wherein the offset is determined as a maximum clock error of the timer of the station, wherein the maximum clock error is calculated from a time information of a listen interval field transmitted when the station is associated with the apparatus, and wherein the time information comprises an interval for the station to awake to receive a beacon frame in power save mode.

* * * * *